US012619781B2

(12) United States Patent
Ghantasala et al.

(10) Patent No.: US 12,619,781 B2
(45) Date of Patent: May 5, 2026

(54) VERBATIM FEEDBACK PROCESSING FOR COMPLIANT RETENTION

(71) Applicant: Microsoft Technology Licensing, LLC, Redmond, WA (US)

(72) Inventors: Maanasa Ghantasala, Redmond, WA (US); Mastafa Hamza Foufa, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 18/650,589

(22) Filed: Apr. 30, 2024

(65) Prior Publication Data

US 2025/0335631 A1 Oct. 30, 2025

(51) Int. Cl.

| | |
|---|---|
| ***G06F 15/16*** | (2006.01) |
| ***G06F 9/54*** | (2006.01) |
| ***G06F 21/62*** | (2013.01) |
| ***G06Q 30/0282*** | (2023.01) |
| ***H04L 29/06*** | (2006.01) |

(52) U.S. Cl.
CPC ..... *G06F 21/6254* (2013.01); *G06Q 30/0282* (2013.01)

(58) Field of Classification Search
CPC ........................ G06F 21/6254; G06Q 30/0282
USPC ............................................................ 726/23
See application file for complete search history.

(56) References Cited

U.S. PATENT DOCUMENTS

| | | | | |
|---|---|---|---|---|
| 8,515,755 B2 * | 8/2013 | Schubert | G06F 40/157 | 704/247 |
| 8,949,209 B2 * | 2/2015 | Khin | G06F 21/6254 | 707/698 |
| 9,595,051 B2 * | 3/2017 | Stack | G06Q 10/10 | |
| 10,746,567 B1 * | 8/2020 | Bernau | G01D 4/002 | |
| 11,228,566 B1 * | 1/2022 | Kothari | G06F 21/6254 | |
| 11,228,568 B1 * | 1/2022 | Dey | H04W 12/02 | |
| 11,681,879 B2 * | 6/2023 | Ridgill | G06F 40/51 | 704/9 |

(Continued)

OTHER PUBLICATIONS

"Using ChatGPT for Topic Modelling and Analysis of Customer Feedback", accessed on link https://www.clearpeaks.com/using-chatgpt-for-topic-modelling-and-analysis-of-customer-feedback/, Apr. 5, 2023, 14 pages.

(Continued)

*Primary Examiner* — Hamza N Algibhah
(74) *Attorney, Agent, or Firm* — Han Gim; Newport IP, LLC

(57) ABSTRACT

A verbatim feedback processing system utilizes generative Artificial Intelligence (AI) which has been trained to rewrite text in a manner that retains the meaning, tone, sentiment, and the like, while also anonymizing the text by removing personal identifiable information. The anonymized feedback is then processed by a similarity validation component and an anonymity validation component. The similarity validation component determines whether the anonymized feedback is within a predetermined similarity threshold of the original feedback. The anonymity validation component determines whether the anonymized feedback satisfies anonymity requirements. If anonymized feedback satisfies similarity and anonymity requirements, the anonymized feedback is stored in an anonymized feedback database.

20 Claims, 6 Drawing Sheets

(56) References Cited

U.S. PATENT DOCUMENTS

| | | | | |
|---|---|---|---|---|
| 11,888,863 | B2 * | 1/2024 | Huston, III | H04L 63/1416 |
| 12,306,816 | B1 * | 5/2025 | Sreekumar | G06F 16/2228 |
| 2007/0185737 | A1 * | 8/2007 | Friedlander | G16H 10/20 707/999.009 |
| 2009/0150919 | A1 * | 6/2009 | Lee | H04N 21/235 725/10 |
| 2014/0280261 | A1 * | 9/2014 | Butler | G06F 21/6245 707/756 |
| 2016/0352900 | A1 * | 12/2016 | Bell | H04M 3/5175 |
| 2017/0250959 | A1 * | 8/2017 | Gordon | G06N 20/00 |
| 2018/0247078 | A1 * | 8/2018 | Newman | G06F 16/93 |
| 2018/0349641 | A1 * | 12/2018 | Barday | H04L 63/102 |
| 2019/0130131 | A1 * | 5/2019 | Huang | G06F 16/285 |
| 2019/0166102 | A1 * | 5/2019 | Chizi | G06Q 30/0641 |
| 2019/0238516 | A1 * | 8/2019 | Weggenmann | G06F 21/6254 |
| 2019/0347344 | A1 * | 11/2019 | Kessler | G06F 11/3055 |
| 2020/0183655 | A1 * | 6/2020 | Barday | G06F 21/6245 |
| 2020/0242138 | A1 * | 7/2020 | Russ | G06F 16/2455 |
| 2021/0264058 | A1 * | 8/2021 | Junkin | H04W 12/02 |
| 2021/0279367 | A1 * | 9/2021 | Khan | G06F 21/577 |
| 2022/0215126 | A1 * | 7/2022 | Almahmoud | G06F 21/602 |
| 2022/0215127 | A1 * | 7/2022 | Oqaily | G06F 21/6209 |
| 2022/0222374 | A1 * | 7/2022 | Antoniou | G06F 21/6254 |
| 2022/0230089 | A1 * | 7/2022 | Peraud | G06N 20/00 |
| 2022/0237390 | A1 * | 7/2022 | Ridgill | G06F 21/6254 |
| 2022/0358162 | A1 * | 11/2022 | Venugopala Reddy | G06F 16/906 |
| 2022/0414262 | A1 * | 12/2022 | Degioanni | G06N 5/02 |
| 2023/0037894 | A1 * | 2/2023 | Arya | G06F 40/40 |
| 2023/0214848 | A1 * | 7/2023 | Sivaswamy | G06Q 30/018 705/317 |
| 2023/0316006 | A1 | 10/2023 | Tunstall-Pedoe | |
| 2023/0367901 | A1 * | 11/2023 | Guillaudeux | G06N 20/00 |
| 2024/0070321 | A1 * | 2/2024 | Minarik | G06F 21/6245 |
| 2024/0095385 | A1 * | 3/2024 | Dhouib | G06F 21/6254 |
| 2024/0143838 | A1 * | 5/2024 | Ardhanari | G16H 30/40 |
| 2024/0221037 | A1 * | 7/2024 | Anwade | G06Q 30/0281 |
| 2024/0241990 | A1 * | 7/2024 | Khan | G06F 16/221 |
| 2024/0265142 | A1 * | 8/2024 | Singh | G06F 21/6254 |
| 2024/0273401 | A1 * | 8/2024 | Huang | G06F 21/6218 |
| 2024/0330349 | A1 * | 10/2024 | Pawde | G06F 16/353 |
| 2024/0354445 | A1 * | 10/2024 | Murugadoss | G06F 40/279 |
| 2024/0403904 | A1 * | 12/2024 | Levitan | G06Q 30/0203 |
| 2025/0217370 | A1 * | 7/2025 | Todd | G06F 16/24573 |

OTHER PUBLICATIONS

Kleinberg, et al., "Textwash—automated open-source text anonymisation", arXiv:2208.13081v1, Aug. 27, 2022, 23 pages.

Mohammedi, Abderrahmane., "Anonymizing Text with NLP: Strategies and Techniques for Ensuring Data Privacy", Medium, Retrieved from the internet: https://medium.com/@manou.mohammedi/anonymizing-text-with-nlp-strategies-and-techniques-for-ensuring-data-privacy-598a99598b3a, Sep. 2, 2023, 12 pages.

Patsakis, et al., "Man vs the machine: The Struggle for Effective Text Anonymisation in the Age of Large Language Models", arXiv:2303.12429v1, Mar. 22, 2023, 19 pages.

Sanjay T.S., "Constructing a Q&A Interface: Harnessing Large Language Models for Verbatim Analysis", Linked in, Retrieved from the internet: https://www.linkedin.com/pulse/constructing-qa-interface-harnessing-large-language-models-sanjay-t-s/, May 17, 2023, 6 pages.

Starc., "Strac Developer Documentation (1.0.0)", accessed on link: https://docs.strac.io/, Sep. 13, 2023, 63 pages.

* cited by examiner

400

402
Receive a verbatim feedback item from a computing device via a network, the verbatim feedback item comprising natural language text 404
Generate a feedback prompt that includes the verbatim feedback item, and provide the feedback prompt to an anonymizer model trained to generate an anonymized feedback item based on the verbatim feedback item, the anonymized feedback item comprising natural language text 406
Provide the anonymized feedback item and the verbatim feedback item to a similarity validation component which generates a similarity score indicative of a similarity between the verbatim feedback item and the anonymized feedback item 408
Provide the anonymized feedback item to an anonymity validation component which generates an anonymity score indicative of whether the anonymized feedback item includes personally identifiable information 410
When the similarity score is within a predefined threshold for the similarity score and the anonymity score indicates that the anonymized feedback does not include personally identifiable information, the anonymized feedback item is saved to a anonymized feedback store 412
When the similarity score is not within the predefined threshold for the similarity score or the anonymity score indicates that the anonymized feedback does include personally identifiable information, the anonymized feedback item is discarded

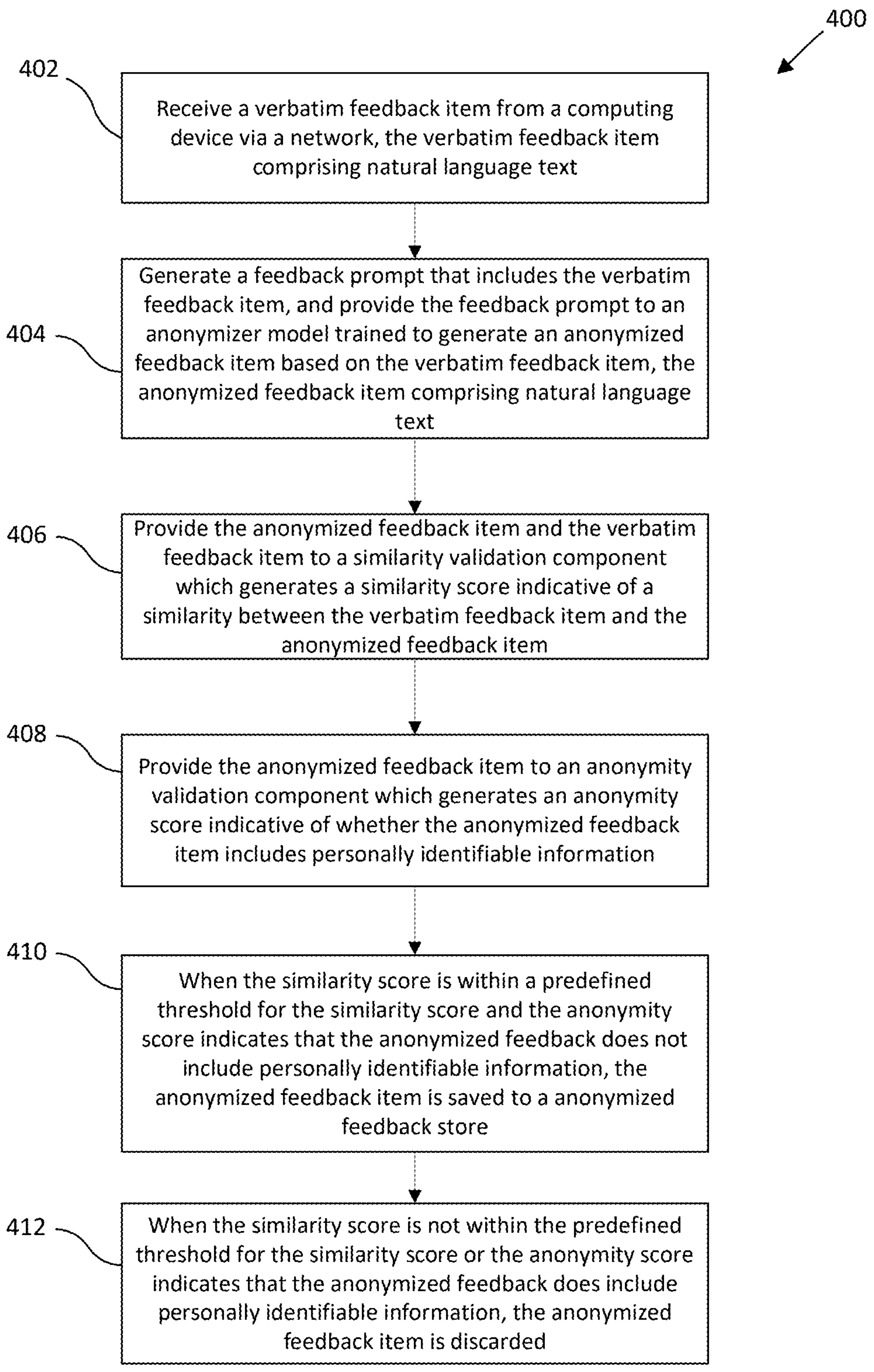

FIG. 4

VERBATIM FEEDBACK PROCESSING FOR COMPLIANT RETENTION

BACKGROUND

Users provide written feedback pertaining to products, applications, services, experiences, and the like through various forums. This feedback is used in insight generation processes to guide development, generate insights, prioritize action items, resolve confusion, and improve customer satisfaction. However, current data privacy regulations limit how feedback data can be collected, stored, and used. For example, data privacy regulations may limit how long user feedback data can be stored. These regulations depend at least in part on whether feedback data includes personal information. Data retention time limits pose challenges to processing large amounts of written text to generate useful information, which can be a time-consuming task. Data retention time limits can be avoided by anonymizing feedback data. However, anonymizing feedback data is faced with the same challenges as insight generation processing as it also requires processing large amounts of written text within data retention time limits. In addition, anonymizing feedback data can alter the meaning, tone, or sentiment of the feedback which defeats the purpose of verbatim feedback analysis.

Thus, what is needed is a method of anonymizing verbatim feedback data that overcomes the limitations and the challenges faced by previously known feedback processing systems.

SUMMARY

In one general aspect, the instant disclosure presents a data processing system having a processor and a memory in communication with the processor wherein the memory stores executable instructions that, when executed by the processor alone or in combination with other processors, cause the data processing system to perform multiple functions. The functions include receiving a verbatim feedback item from a computing device via a network, the verbatim feedback item comprising natural language text; generating a feedback prompt that includes the verbatim feedback item and providing the feedback prompt to an anonymizer model, the anonymizer model being trained to generate an anonymized feedback item based on the verbatim feedback item included in the feedback prompt, the anonymized feedback item comprising natural language text; providing the anonymized feedback item and the verbatim feedback item to a similarity validation component which generates a similarity score based on a similarity metric indicative of a level of similarity between the anonymized feedback item and the verbatim feedback item; providing the anonymized feedback item to an anonymity validation component which generates an anonymity score indicative of whether the anonymized feedback item includes personally identifiable information; in response to the similarity score being within a predefined threshold for the similarity score and the anonymity score indicating that the anonymized feedback does not include personally identifiable information, saving the anonymized feedback item to an anonymized feedback store; and in response to the similarity score not being within the predefined threshold for the similarity score or the anonymity score indicating that the anonymized feedback does include personally identifiable information, discarding the anonymized feedback item without saving the anonymized feedback item in the anonymized feedback store.

In yet another general aspect, the instant disclosure presents a method of processing verbatim feedback that comprises receiving a verbatim feedback item from a computing device via a network, the verbatim feedback item comprising natural language text; generating a feedback prompt that includes the verbatim feedback item and providing the feedback prompt to an anonymizer model, the anonymizer model being trained to generate an anonymized feedback item based on the verbatim feedback item included in the feedback prompt, the anonymized feedback item comprising natural language text; providing the anonymized feedback item and the verbatim feedback item to a similarity validation component which generates a similarity score based on a similarity metric indicative of a level of similarity between the anonymized feedback item and the verbatim feedback item; providing the anonymized feedback item to an anonymity validation component which generates an anonymity score indicative of whether the anonymized feedback item includes personally identifiable information; in response to the similarity score being within a predefined threshold for the similarity score and the anonymity score indicating that the anonymized feedback does not include personally identifiable information, saving the anonymized feedback item to an anonymized feedback store; and in response to the similarity score not being within the predefined threshold for the similarity score or the anonymity score indicating that the anonymized feedback does include personally identifiable information, discarding the anonymized feedback item without saving the anonymized feedback item in the anonymized feedback store.

In a further general aspect, the instant application describes a non-transitory computer readable medium on which are stored instructions that when executed cause a programmable device to perform functions of receiving a verbatim feedback item from a computing device via a network, the verbatim feedback item comprising natural language text; generating a feedback prompt that includes the verbatim feedback item and providing the feedback prompt to an anonymizer model, the anonymizer model being trained to generate an anonymized feedback item based on the verbatim feedback item included in the feedback prompt, the anonymized feedback item comprising natural language text; providing the anonymized feedback item and the verbatim feedback item to a similarity validation component which generates a similarity score based on a similarity metric indicative of a level of similarity between the anonymized feedback item and the verbatim feedback item; providing the anonymized feedback item to an anonymity validation component which generates an anonymity score indicative of whether the anonymized feedback item includes personally identifiable information; in response to the similarity score being within a predefined threshold for the similarity score and the anonymity score indicating that the anonymized feedback does not include personally identifiable information, saving the anonymized feedback item to an anonymized feedback store; and in response to the similarity score not being within the predefined threshold for the similarity score or the anonymity score indicating that the anonymized feedback does include personally identifiable information, discarding the anonymized feedback item without saving the anonymized feedback item in the anonymized feedback store.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 is a flow diagram depicting an example method of anonymizing verbatim feedback using the feedback processing system of FIG. 3.

DETAILED DESCRIPTION

Figure 1:
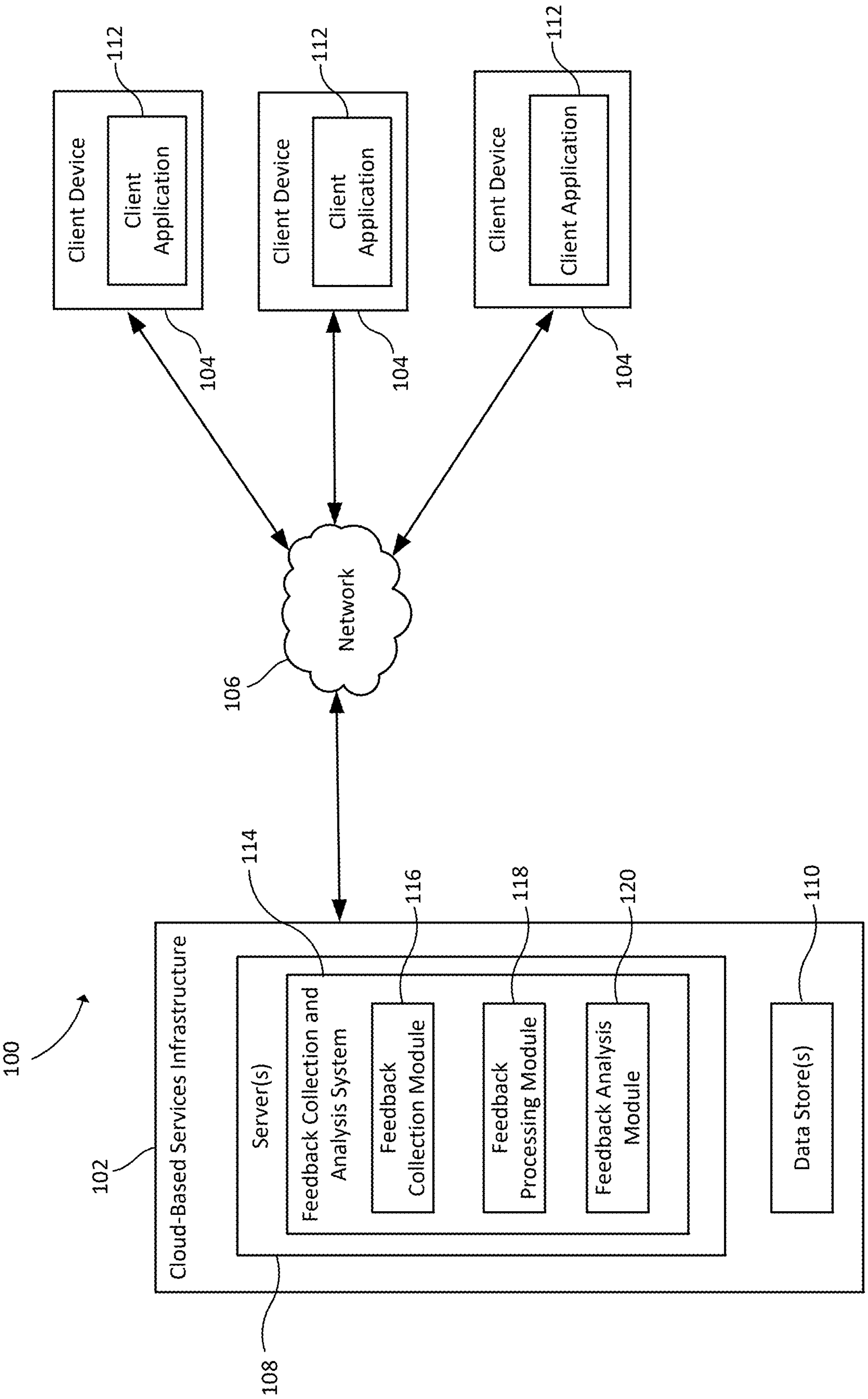
FIG. 1 depicts a computing environment in which a feedback processing and analysis system according to this disclosure may be implemented.

Verbatim feedback (also referred to as simply “verbatim”) typically refers to written feedback (e.g., comments, suggestions, opinions, etc.) regarding a product, service, or experience that is collected and processed in a manner that preserves the wording, meaning, context, tone, and/or sentiment in which the feedback was provided. Verbatim feedback can provide a valuable source of information which can be used to guide development, generate insights, prioritize action items, resolve confusion, and ultimately improve customer satisfaction.

However, while the collection and use of verbatim feedback can provide many benefits to businesses, it also comes with data privacy challenges. In the act of expressing themselves, a customer can directly or indirectly refer to people, places, and/or things which could be used to derive their identity without their consent. As a result, data privacy laws and regulations have been put in place to govern how personal data is handled in order to protect the privacy rights of individuals whose information has been collected. These regulations are designed to ensure that personal information is collected, used, stored, and shared in a responsible and lawful manner. The specific requirements and scope of privacy regulations can vary by country or region, but they generally aim to safeguard individuals’ personal data and establish rules for organizations that process this data.

Data privacy laws/regulations often include data retention policies which impose limits on the amount of time (e.g., 30 days) that verbatim feedback can be retained and used by an entity before it must be deleted. However, analyzing large amounts of written text to derive insights and actionable data can be a time-consuming process. Data retention policies, therefore, adversely impact the ability to derive useful information from verbatim feedback.

Data retention time limits can be avoided if verbatim feedback satisfies certain anonymity requirements. Some previously known feedback processing systems therefore attempt to avoid data retention restrictions by anonymizing verbatim feedback so it complies with data privacy regulations. However, current anonymization techniques are also time-consuming processes. As such, it can be challenging to anonymize large amounts of feedback data while also complying with data retention time limits using such techniques. In addition, current anonymization techniques can result in changes that alter the meaning, context, tone, and/or sentiment of the feedback. Deriving insights and guidance from such feedback could be problematic to say the least.

To address the technical problems associated with processing verbatim feedback in light of data privacy restrictions, this description provides technical solutions in the form of a verbatim feedback processing system that utilizes generative Artificial Intelligence (AI), such as a Large Language Model (LLM), which has been trained to rewrite the text in a manner that retains the meaning, tone, sentiment, and the like, while also anonymizing the text, e.g., by removing personal identifiable information (PII). The anonymized feedback is then processed by a similarity validation component and an anonymity validation component. The similarity validation component is used to ensure that the anonymized feedback is sufficiently similar to the original feedback in meaning, tone, sentiment, etc. To accomplish this, the similarity validation component implements a machine learning model or algorithm that measures a similarity between the original feedback and the anonymized feedback using one or more similarity metrics, such as cosine similarity. The similarity validation component generates a similarity value, or score, which is indicative of the similarity between the original feedback and the anonymized feedback. The similarity score is then compared to a predetermined similarity score threshold or threshold range to determine whether the anonymized feedback is sufficiently similar to retain in a long term feedback store. For example, in various implementations, the similarity score is a measure of the cosine similarity between the original feedback and the anonymized feedback which can have a value between −1 and 1. A threshold range may be defined in this case, e.g., 0 to 0.8, such that anonymized feedback items having a similarity score within this range are selected for retention while anonymized feedback items having a score outside of this range are discarded (i.e., deleted).

The anonymity validation component is used to ensure that the anonymized feedback is sufficiently anonymous (e.g., complies with relevant data privacy guidelines). The anonymity validation component implements one or more AI models, machine learning models, algorithms, and the like which are capable of recognizing PII entities in text. In various implementations, the anonymity validation component generates an anonymity value, or score, which is indicative of whether the anonymized feedback contains any PII entities. As an example, the anonymity validation component may output an anonymity score of 1 when no PII entities are detected in an anonymized feedback item and a score of 0 when a PII is detected in an anonymized feedback item. Therefore, anonymized feedback items having an anonymity score of 1 are selected for retention while anonymized feedback items having an anonymity score of 0 are discarded.

Anonymized feedback items must satisfy both the similarity requirement and the anonymity requirement to ultimately be selected for retention in a long term feedback store, such as a database. The feedback items that are stored in this database can be retained for a longer period of time which enables the feedback to be analyzed to generate insights and glean actionable information without having to worry about data retention time limits. The process enables feedback data to be anonymized at scale in an efficient manner which saves time and computing resources.

FIG. 1 shows an example computing environment 100 in which aspects of the disclosure may be implemented. The computing environment 100 includes cloud-based services infrastructure 102 and client devices 104 which communicate with each other via a network 106. The network 106 includes one or more wired, wireless, and/or a combination of wired and wireless networks. In some implementations, the network 106 includes one or more local area networks (LAN), wide area networks (WAN) (e.g., the Internet), public networks, private networks, virtual networks, mesh networks, peer-to-peer networks, and/or other interconnected data paths across which multiple devices may communicate. In some examples, the network 106 is coupled to or includes portions of a telecommunications network for sending data in a variety of different communication protocols. In some implementations, the network 106 includes Bluetooth® communication networks or a cellular communications network for sending and receiving data including via short messaging service (SMS), multimedia messaging service (MMS), hypertext transfer protocol (HTTP), direct data connection, WAP, email, and the like.

The cloud-based services infrastructure 102 provides one or more services which are accessible to users of client devices 104 over the network 106. To this end, the cloud-based services infrastructure 102 is executed on or includes at least one server 108 which is configured to provide computational and/or storage resources for implementing the cloud-based services infrastructure 102. The server 108 is representative of any physical or virtual computing system, device, or collection thereof, such as, a web server, rack server, blade server, virtual machine server, or tower server, as well as any other type of computing system used to implement the cloud-based services infrastructure 102. Servers are implemented using any suitable number and type of physical and/or virtual computing resources (e.g., standalone computing devices, blade servers, virtual machines, etc.). Cloud-based services infrastructure 102 may also include one or more data stores 110 for storing data, programs, and the like for implementing and managing the cloud-based services infrastructure 102. In FIG. 1, one server 108 and one data store 110 are shown, although any suitable number of servers and/or data stores may be utilized.

Client devices 104 enable users to access the services provided by the cloud-based services infrastructure 102 via the network 106. Client devices 104 can be any suitable type of computing device, such as personal computers, desktop computers, laptop computers, smart phones, tablets, gaming consoles, smart televisions and the like. Client devices 104 include at least one client application 112 that is configured to interact with the cloud-based services infrastructure 102. In various implementations, client application 112 is a dedicated application installed on the client device and programmed to interact with one or more services provided by a cloud infrastructure. In some implementations, client application 112 is an add-on, extension, or the like that can be integrated into other applications to enable interaction with the cloud-based services infrastructure 102. In some cases, client application 112 is a general-purpose application, such as a web browser, configured to access services and/or applications over the network 106.

The cloud-based services infrastructure 102 includes a verbatim feedback collection and analysis system 114 for collecting and analyzing verbatim feedback received from users. In some implementations, the verbatim feedback collection and analysis system 114 is utilized by one or more of the services provided by the cloud-based service 102 to collect verbatim feedback pertaining to the use of those services. In other limitations, the verbatim feedback collection and analysis system 114 is used to implement a verbatim feedback collection service which can provide feedback collection and analysis services to other services and applications over the network 106.

The verbatim feedback collection and analysis system 114 includes a feedback collection module 116, a feedback processing module 118, and a feedback analysis module 120. The feedback collection module 116 is configured to generate feedback requests (e.g., surveys, questionnaires, etc.) which are presented to users via a user interface of the client application 112. User feedback is returned to the feedback collection module 116 as verbatim feedback. The feedback processing module 118 is capable of efficient anonymization of the verbatim feedback with similarity and anonymity validation in accordance with this disclosure. The feedback analysis module 120 is used to analyze the anonymized feedback to generate feedback analysis data which includes insights, actionable information, and the like pertaining to the application, product, service, experience, etc. for which the feedback was provided.

Figure 2:
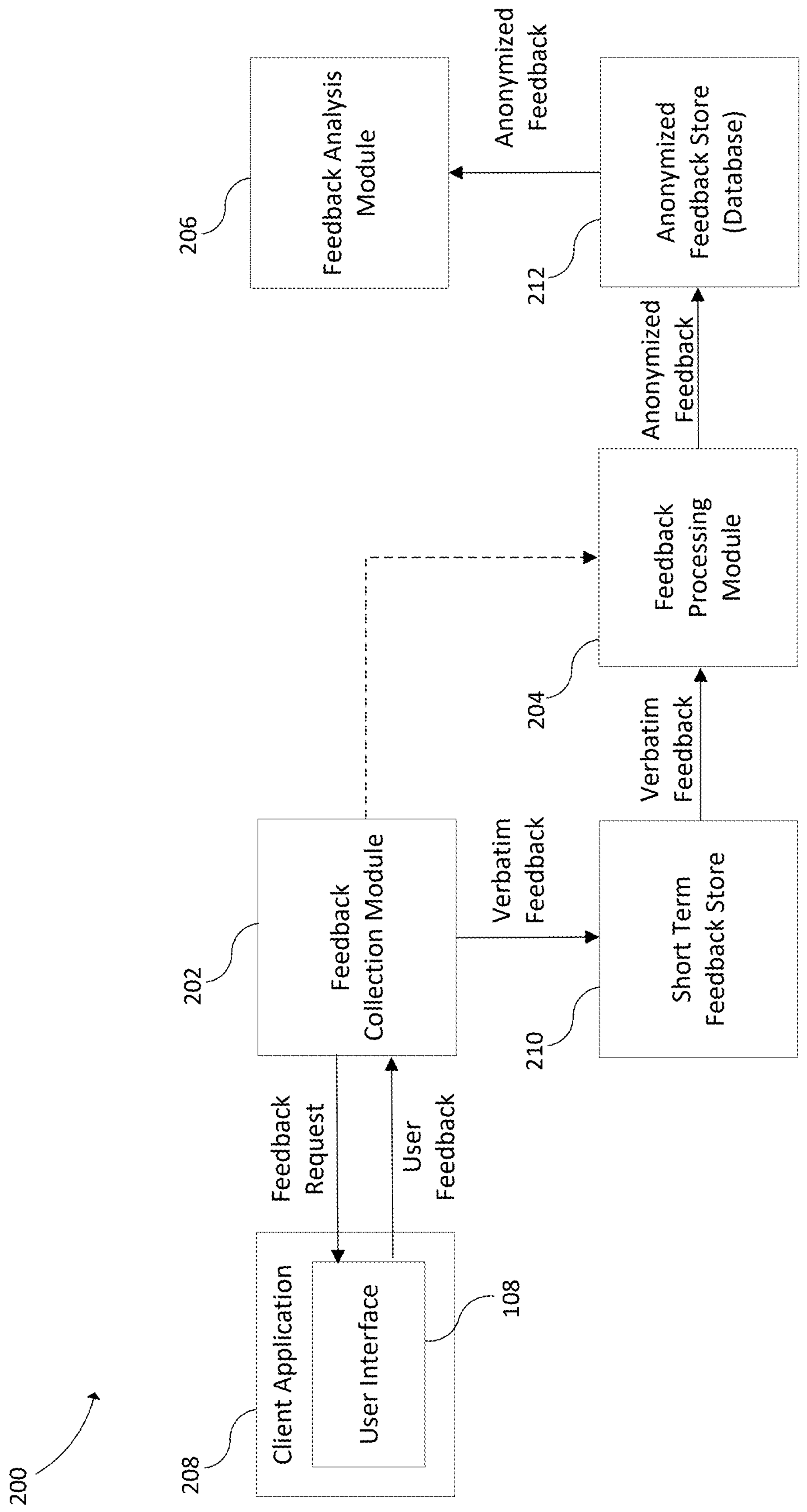
FIG. 2 depicts an example implementation of the feedback processing and analysis system of FIG. 1.

An example implementation of a verbatim feedback collection and analysis system 200 is shown in FIG. 2. The verbatim feedback collection and analysis system 200 includes a feedback collection module 202, a feedback processing module 204, and a feedback analysis module 206. The feedback collection module 202 is used to collect verbatim feedback from users. To this end, the feedback collection module 202 is capable of generating feedback requests, such as surveys, questionnaires, requests for comments, and the like, pertaining to one or more products, applications, services, experiences, and the like with which a user may have experience. The feedback requests are presented to users via a user interface 208 (e.g., dialog, pop-up, etc.). The user interface 208 receives user feedback in the form of natural language text entered via a user input device, such as a keyboard, touchscreen, microphone, etc., which is returned to the feedback collection module 202. The user feedback also includes metadata which identifies the system, application, product, and the like for which the feedback is being provided as well as other relevant information, such as date, time, survey identifier, etc. Metadata can be kept with the feedback throughout the process.

In various implementations, the verbatim feedback may be stored in a short term feedback store 210. The short term feedback store 210 is used to store verbatim feedback items in compliance with data privacy laws/regulations for data which is not considered anonymous. For example, in some implementations, the short term feedback store 210 may be used to store verbatim feedback for 30 days, after which the verbatim feedback is deleted. The feedback processing module 204 accesses the short term feedback store 210 to retrieve verbatim feedback items for processing. In some implementations, the feedback processing module 204 receives verbatim feedback items directly from the feedback collection module 202 as they are received.

The feedback processing module 204 includes the components needed for efficient anonymization of verbatim feedback with similarity and anonymity validation in accordance with this disclosure (explained in more detail below).

The feedback processing module 204 outputs anonymized feedback items which satisfy similarity and anonymity requirements to an anonymized feedback store 212. In various implementations, the anonymized feedback store 212 comprises a database, or other suitable data structure or file.

The feedback analysis module 206 is configured to access anonymized feedback from the anonymized feedback store 212 and to perform various data processing and analysis processes on the anonymized feedback to generate feedback analysis data which includes insights, actionable information, and the like derived from the anonymized feedback. In various implementations, the feedback analysis module generates one or more reports for presenting the feedback analysis data to users of the feedback collection and analysis system 200.

Figure 3:
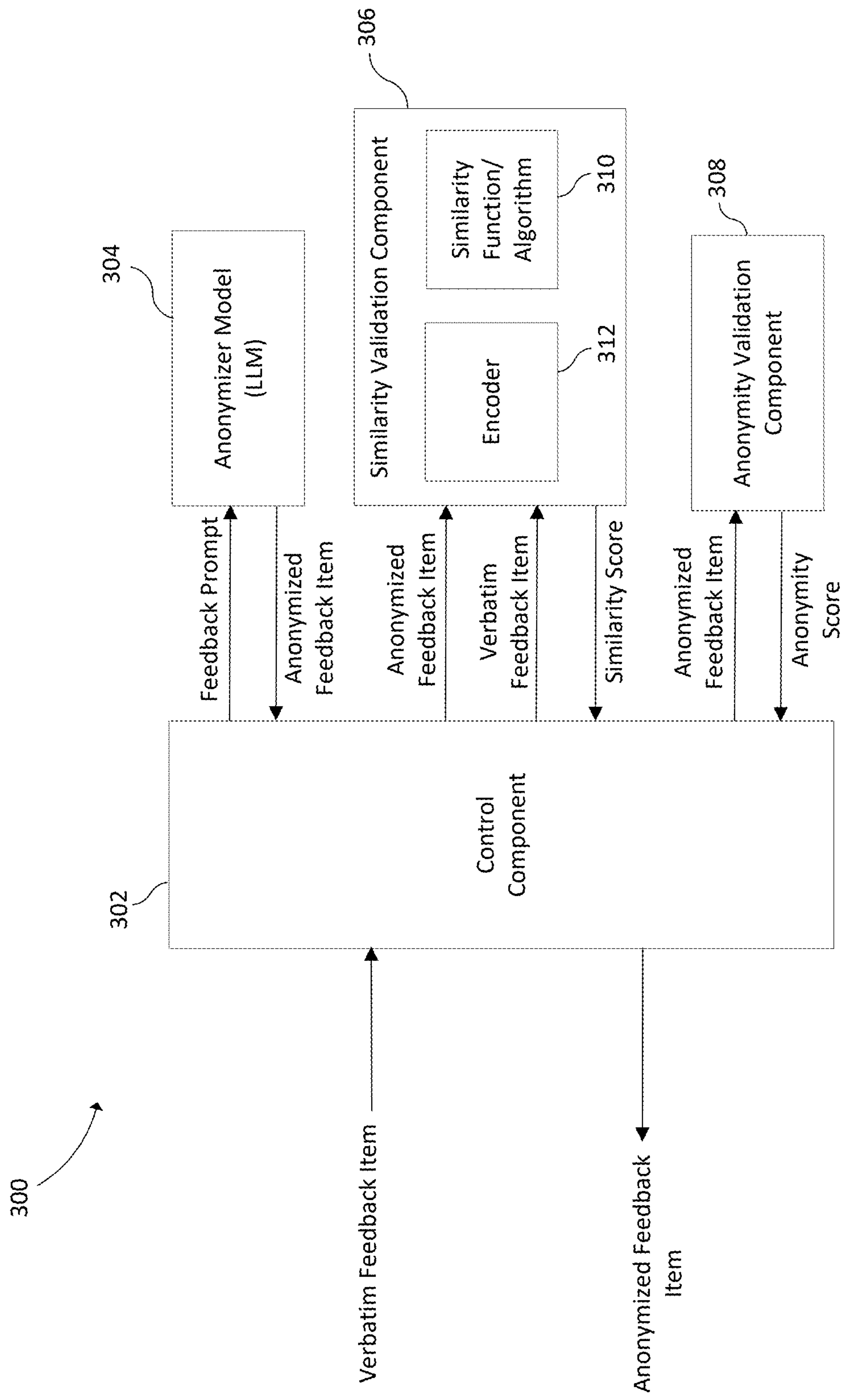
FIG. 3 depicts an example implementation of a feedback processing system of the feedback processing and analysis system of FIG. 2.

An example implementation of a feedback processing module 300 is shown in FIG. 3. The feedback processing module 300 includes a control component 302, an anonymizer model 304, a similarity validation component 306, and an anonymity validation component 308. The control component 302 receives verbatim feedback items (e.g., from a client device) and controls the transfer of relevant data to and from the other components to generate anonymized feedback items which are provided as output (e.g., to an anonymized feedback store). In the example of FIG. 2, the control component 302 generates a feedback prompt for the anonymizer model 304 that includes a verbatim text item. In some implementations, the feedback prompt includes instructions for causing the anonymizer model to generate an anonymized feedback item based on the verbatim feedback item which is provided as input. In other implementations, the anonymizer model is trained to generate anonymized feedback items from verbatim feedback items without requiring explicit instructions. The control component 302 is configured to generate the feedback prompt in any format capable of being understood by the anonymizer model. In various implementations, the anonymizer model 304 comprises a generative language model trained to generate anonymized feedback text based on the verbatim feedback text which is provided as input. In various implementations, the generative language model is an LLM. Examples of LLMs include, but are not limited to, GPT-based models, e.g., GPT-3, GPT-4, ChatGPT, and the like. In other embodiments, any suitable type and number of language learning/processing models may be utilized.

The control component 302 provides the verbatim feedback item and the anonymized feedback item generated based on the verbatim feedback item to the similarity validation component 306. The similarity validation component is used to ensure that the anonymized feedback item has a predetermined level of similarity to the verbatim feedback item. To this end, the similarity validation component 306 implements a similarity function/algorithm 310 for comparing the anonymized feedback item with the verbatim feedback item based on at least one similarity metric. The similarity function/algorithm may be implemented using any suitable type and/or combination of AI models, machine learning (ML) models, ML algorithms, etc. In various implementations, the similarity function/algorithm 310 is based on the cosine similarity metric although any suitable similarity metric may be used. The similarity validation component 306 includes an encoder 312 which transforms the anonymized feedback item and the corresponding verbatim feedback item to embeddings for processing by the similarity function/algorithm 310. In various implementations, the encoder 312 comprises a pre-trained Sentence BERT (SBERT) model (e.g., all-MiniLM-L6-v2) to convert each feedback item into a sentence embedding.

The similarity validation component generates a similarity value, or score, which is indicative of the similarity between the original feedback and the anonymized feedback. The similarity score is returned to the control component 302 where it is compared to a predetermined similarity score threshold or threshold range to determine whether the anonymized feedback is sufficiently similar to retain in the anonymized feedback store. In various implementations, the similarity score is a measure of the cosine similarity between the original feedback and the anonymized feedback which can have a value between −1 and 1. A threshold range may be defined in this case of, for example, 0 to 0.8, such that anonymized feedback items having a similarity score within this range are selected for potential retention while anonymized feedback items having a score outside of this range are discarded (i.e., deleted).

The control component 302 also provides the anonymized feedback item to the anonymity validation component 308 which processes the anonymized feedback item to determine whether the feedback item complies with data privacy guidelines, e.g., does not include any PII. The anonymity validation component implements one or more AI models, machine learning models, algorithms, and the like which are capable of recognizing PII entities in text. In various implementations, the anonymity validation component generates an anonymity value, or score, which is indicative of whether the anonymized feedback contains any PII entities. As an example, the anonymity validation component may output an anonymity score of 1 when no PII entities are detected in an anonymized feedback item and a score of 0 when a PII is detected in an anonymized feedback item. Therefore, anonymized feedback items having an anonymity score of 1 are selected for potential retention while anonymized feedback items having an anonymity score of 0 are discarded.

The control component 302 processes the anonymized feedback item based on the similarity score and the anonymity score for the feedback item. If the anonymized feedback item has a similarity score that is within the similarity threshold range and an anonymity score indicating that there is no PII information in the feedback item, the anonymized feedback item is provided as an output to the anonymized feedback store. Otherwise, the anonymized feedback item is discarded without storing the item in the anonymized feedback store.

In some implementations, anonymized feedback items which do not satisfy similarity and/or anonymity requirements can be returned to the anonymizer model 304 with a prompt that includes instructions for generating the anonymized feedback item with different characteristics based on the similarity score and/or the anonymity score. For example, the anonymity validation component may be configured to output information which identifies PII entities found in the item. The anonymized feedback item can then be returned to the anonymizer model 304 with instructions to remove the identified entities. Adjusted anonymized feedback items can then be delivered to the similarity validation component 306 and anonymity validation component 308 to generate new similarity and anonymity scores.

FIG. 4 depicts a flowchart of an example method 400 of processing verbatim feedback using the feedback processing system of FIG. 3. The method 400 begins with receiving a verbatim feedback item from a computing device via a network, the verbatim feedback item comprising natural language text (block 402). The verbatim feedback item can include metadata which identifies the system, application, product, experience, etc. that the feedback item applies to as well as other information, such as date, time, survey version, etc. A feedback prompt is then generated that includes the verbatim feedback item (block 404), and the feedback prompt is provided to an anonymizer model trained to generate an anonymized feedback item based on the verbatim feedback item, the anonymized feedback item comprising natural language text. The anonymized feedback item and the verbatim feedback item are then provided to a similarity validation component which generates a similarity score based on a similarity metric, the similarity metric being indicative of a level of similarity between the anonymized feedback item and the verbatim feedback item (block 406). The anonymized feedback item is also provided to an anonymity validation component which generates an anonymity score indicative of whether the anonymized feedback item includes personally identifiable information (block 408). When the similarity score is within a predefined threshold for the similarity score and the anonymity score indicates that the anonymized feedback docs not include personally identifiable information, the anonymized feedback item is saved to an anonymized feedback store (block 410). When the similarity score is not within the predefined threshold for the similarity score or the anonymity score indicates that the anonymized feedback does include personally identifiable information, the anonymized feedback item is discarded (block 412).

Figure 5:
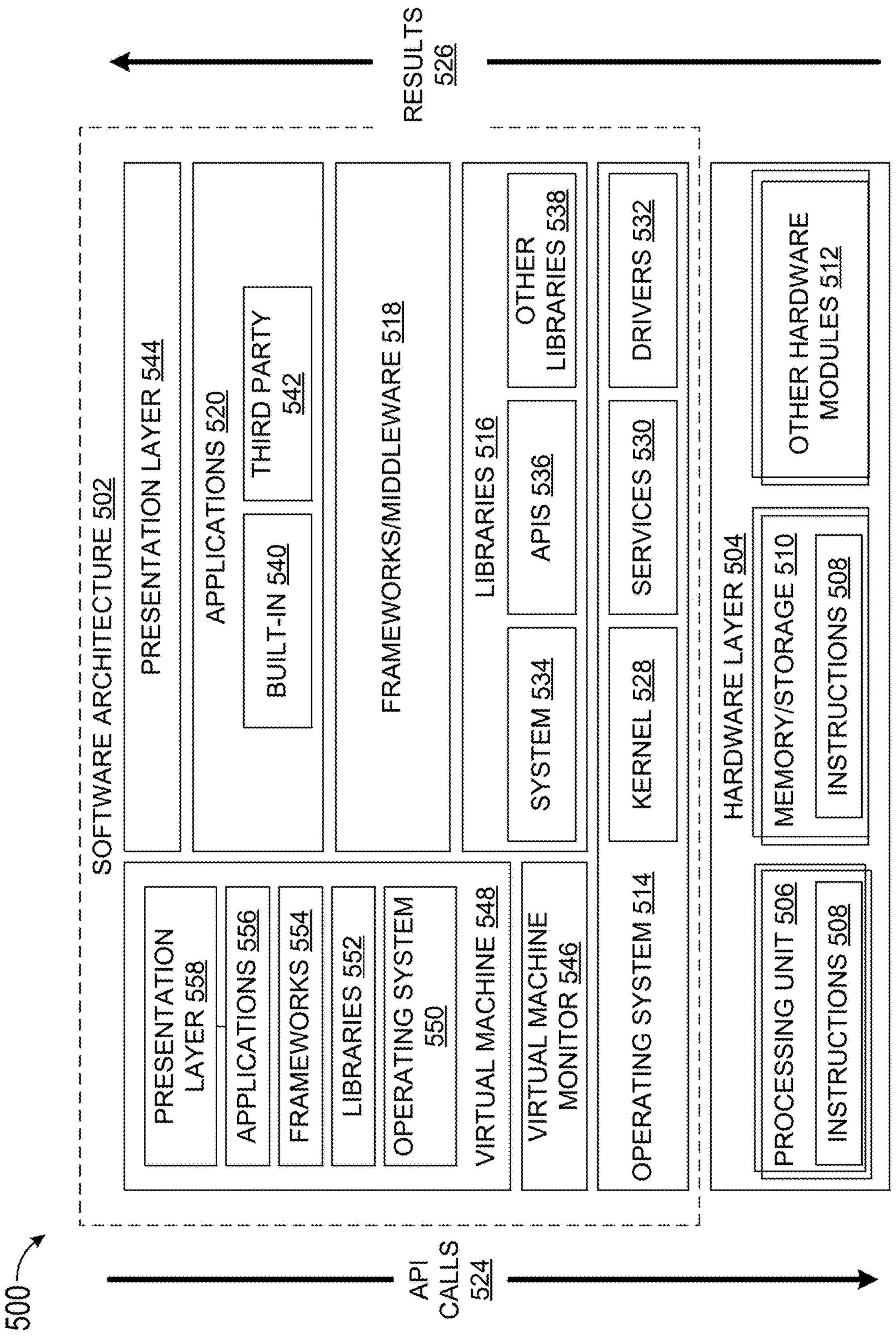
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
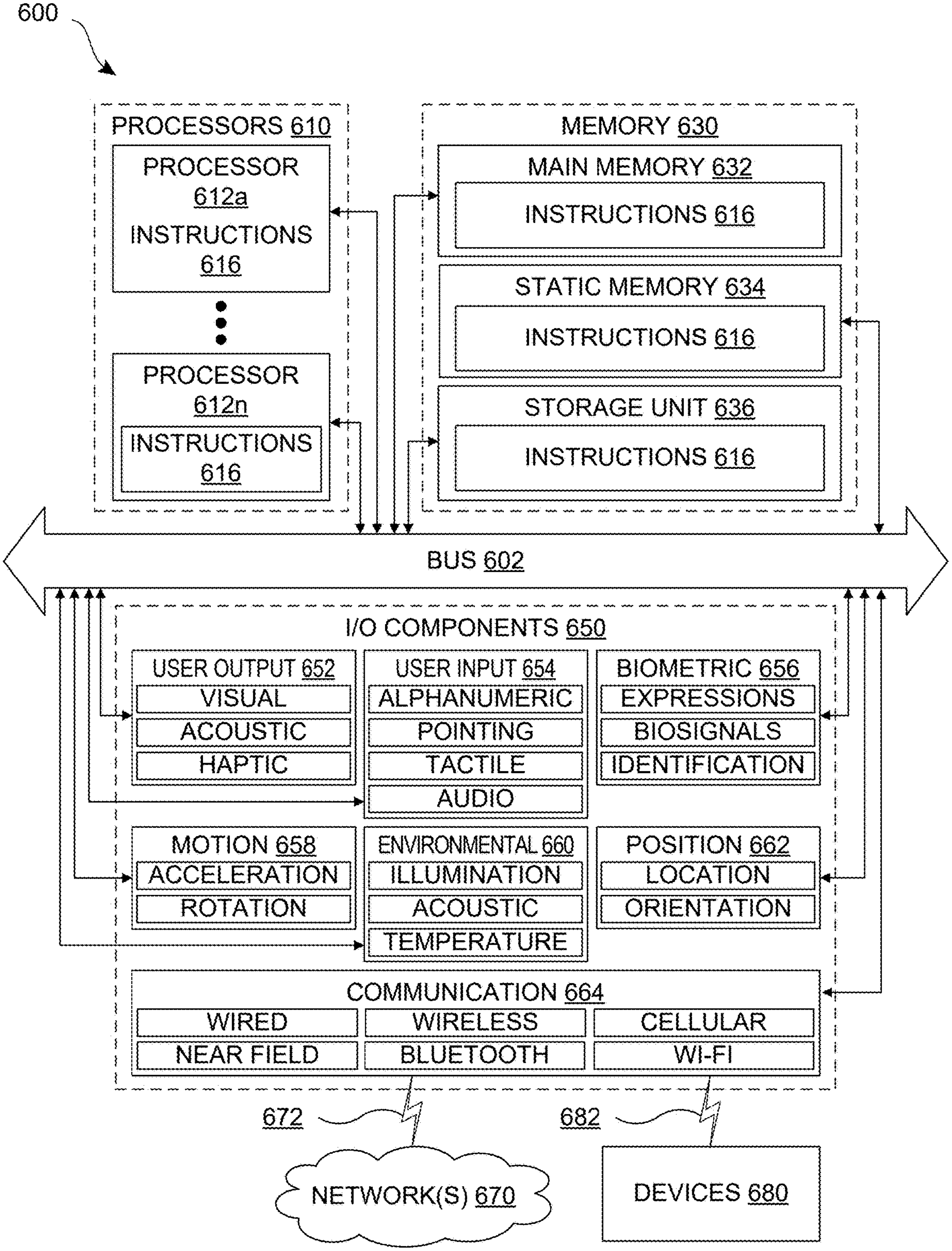
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

What is claimed is:

1. A data processing system comprising:

a processor; and a memory in communication with the processor, the memory comprising executable instructions that, when executed by the processor alone or in combination with other processors, cause the data processing system to perform functions of:

receiving a verbatim feedback item from a computing device via a network, the verbatim feedback item comprising natural language text entered via a user input device and comprising unstructured content including sentences and expressions;

generating a feedback prompt that includes the verbatim feedback item and providing the feedback prompt to an anonymizer model, the anonymizer model comprising a generative language model trained to process the natural language input to rewrite the text while preserving linguistic characteristics including meaning, tone, and sentiment, the anonymizer model being trained to generate an anonymized feedback item based on the verbatim feedback item included in the feedback prompt, the anonymized feedback item comprising natural language text;

providing the anonymized feedback item and the verbatim feedback item to a similarity validation component which generates a similarity score based on a similarity metric indicative of a level of similarity between the anonymized feedback item and the verbatim feedback item, wherein the similarity validation component processes the verbatim feedback item and the anonymized feedback item as natural language input by converting each into a semantic embedding representing linguistic meaning and context, and computes the similarity score using a similarity metric that quantifies semantic relatedness between the semantic embeddings;

providing the anonymized feedback item to an anonymity validation component which generates an anonymity score indicative of whether the anonymized feedback item includes personally identifiable information;

in response to the similarity score being within a predefined threshold for the similarity score and the anonymity score indicating that the anonymized feedback does not include personally identifiable information, saving the anonymized feedback item to an anonymized feedback store; and in response to the similarity score not being within the predefined threshold for the similarity score or the anonymity score indicating that the anonymized feedback does include personally identifiable information, discarding the anonymized feedback item without saving the anonymized feedback item in the anonymized feedback store.

2. The data processing system of claim 1, wherein saving the anonymized feedback item includes saving metadata in association with the anonymized feedback item that identifies at least one product, application, service, and experience that the anonymized feedback item is directed to.

3. The data processing system of claim 1, wherein the similarity metric comprises cosine similarity.

4. The data processing system of claim 3, wherein the predefined threshold for the similarity score is 0 to 0.8.

5. The data processing system of claim 1, wherein the functions further comprise:

transforming the anonymized feedback item to an anonymized sentence embedding and the verbatim feedback item to a verbatim sentence embedding using a pre-trained Sentence BERT (SBERT) model.

6. The data processing system of claim 1, wherein the anonymity validation component comprises at least one artificial intelligence (AI) model or machine learning model trained to recognize personal identifiable information in natural language text.

7. The data processing system of claim 1, wherein the functions further comprise:

saving a plurality of anonymized feedback items in the anonymized feedback store; and processing the plurality of anonymized feedback items using a feedback analysis component, the feedback analysis component being configured to generate feedback analysis data pertaining to the plurality of anonymized feedback items, the feedback analysis data including insights and/or action items pertaining to a product, application, service, or experience to which the plurality of anonymized feedback items pertain.

8. The data processing system of claim 1, wherein the functions further comprise:

generating a feedback request that includes a survey, at least one question, and/or a request for comments and displaying the feedback request in a user interface of a computing device, wherein the verbatim feedback item is received in response to the feedback request.

9. A method of processing verbatim feedback, the method comprising:

receiving a verbatim feedback item from a computing device via a network, the verbatim feedback item comprising natural language text entered via a user input device and comprising unstructured content including sentences and expressions;

generating a feedback prompt that includes the verbatim feedback item and providing the feedback prompt to an anonymizer model, the anonymizer model comprising a generative language model trained to process the natural language input to rewrite the text while preserving linguistic characteristics including meaning, tone, and sentiment, the anonymizer model being trained to generate an anonymized feedback item based on the verbatim feedback item included in the feedback prompt, the anonymized feedback item comprising natural language text;

providing the anonymized feedback item and the verbatim feedback item to a similarity validation component which generates a similarity score based on a similarity metric indicative of a level of similarity between the anonymized feedback item and the verbatim feedback item, wherein the similarity validation component processes the verbatim feedback item and the anonymized feedback item as natural language input by converting each into a semantic embedding representing linguistic meaning and context, and computes the similarity score using a similarity metric that quantifies semantic relatedness between the semantic embeddings;

providing the anonymized feedback item to an anonymity validation component which generates an anonymity score indicative of whether the anonymized feedback item includes personally identifiable information;

in response to the similarity score being within a predefined threshold for the similarity score and the anonymity score indicating that the anonymized feedback does not include personally identifiable information, saving the anonymized feedback item to an anonymized feedback store; and in response to the similarity score not being within the predefined threshold for the similarity score or the anonymity score indicating that the anonymized feedback does include personally identifiable information, discarding the anonymized feedback item without saving the anonymized feedback item in the anonymized feedback store.

10. The method of claim 9, wherein saving the anonymized feedback item includes saving metadata in association with the anonymized feedback item that identifies at least one product, application, service, and experience that the anonymized feedback item is directed to.

11. The method of claim 9, wherein the similarity metric comprises cosine similarity.

12. The method of claim 11, wherein the predefined threshold for the similarity score is 0 to 0.8.

13. The method of claim 9, further comprising:

transforming the anonymized feedback item to an anonymized sentence embedding and the verbatim feedback item to a verbatim sentence embedding using a pre-trained Sentence BERT (SBERT) model.

14. The method of claim 9, wherein the anonymity validation component comprises at least one artificial intelligence (AI) model or machine learning model trained to recognize personal identifiable information in natural language text.

15. The method of claim 9, further comprising:

saving a plurality of anonymized feedback items in the anonymized feedback store; and processing the plurality of anonymized feedback items using a feedback analysis component, the feedback analysis component being configured to generate feedback analysis data pertaining to the plurality of anonymized feedback items, the feedback analysis data including insights and/or action items pertaining to a product, application, service, or experience to which the plurality of anonymized feedback items pertain.

16. The method of claim 9, further comprising:

generating a feedback request that includes a survey, at least one question, and/or a request for comments and displaying the feedback request in a user interface of a computing device, wherein the verbatim feedback item is received in response to the feedback request.

17. A non-transitory computer readable medium on which are stored instructions that, when executed, cause a programmable device to perform functions of:

receiving a verbatim feedback item from a computing device via a network, the verbatim feedback item comprising natural language text entered via a user input device and comprising unstructured content including sentences and expressions;

generating a feedback prompt that includes the verbatim feedback item and providing the feedback prompt to an anonymizer model, the anonymizer model comprising a generative language model trained to process the natural language input to rewrite the text while preserving linguistic characteristics including meaning, tone, and sentiment, the anonymizer model being trained to generate an anonymized feedback item based on the verbatim feedback item included in the feedback prompt, the anonymized feedback item comprising natural language text;

providing the anonymized feedback item and the verbatim feedback item to a similarity validation component which generates a similarity score based on a similarity metric indicative of a level of similarity between the anonymized feedback item and the verbatim feedback item, wherein the similarity validation component processes the verbatim feedback item and the anonymized feedback item as natural language input by converting each into a semantic embedding representing linguistic meaning and context, and computes the similarity score using a similarity metric that quantifies semantic relatedness between the semantic embeddings;

providing the anonymized feedback item to an anonymity validation component which generates an anonymity score indicative of whether the anonymized feedback item includes personally identifiable information;

in response to the similarity score being within a predefined threshold for the similarity score and the anonymity score indicating that the anonymized feedback does not include personally identifiable information, saving the anonymized feedback item to an anonymized feedback store; and in response to the similarity score not being within the predefined threshold for the similarity score or the anonymity score indicating that the anonymized feedback does include personally identifiable information, discarding the anonymized feedback item without saving the anonymized feedback item in the anonymized feedback store.

18. The non-transitory computer readable medium of claim 17, wherein the similarity metric comprises cosine similarity.

19. The non-transitory computer readable medium of claim 17, wherein the functions further comprise:

transforming the anonymized feedback item to an anonymized sentence embedding and the verbatim feedback item to a verbatim sentence embedding using a pre-trained Sentence BERT (SBERT) model.

20. The non-transitory computer readable medium of claim 17, wherein the functions further comprise:

saving a plurality of anonymized feedback items in the anonymized feedback store; and processing the plurality of anonymized feedback items using a feedback analysis component, the feedback analysis component being configured to generate feedback analysis data pertaining to the plurality of anonymized feedback items, the feedback analysis data including insights and/or action items pertaining to a product, application, service, or experience to which the plurality of anonymized feedback items pertain.

* * * * *